(12) United States Patent
Hou et al.

(10) Patent No.: US 7,987,354 B2
(45) Date of Patent: Jul. 26, 2011

(54) UPDATING A SOURCE IMAGE FILE IN A BIOS MEMORY

(75) Inventors: Chih-Jen Hou, Taipei Hsien (TW); Hsin-Teng Fu, Taipei Hsien (TW); Sheng-Wen Wu, Taipei Hsien (TW)

(73) Assignee: Giga-Byte Technology Co., Ltd, Hsin-Tien, New Taipei (TW)

( * ) Notice: Subject to any disclaimer, the term of this patent is extended or adjusted under 35 U.S.C. 154(b) by 772 days.

(21) Appl. No.: 12/007,660

(22) Filed: Jan. 14, 2008

(65) Prior Publication Data
US 2009/0063844 A1 Mar. 5, 2009

(30) Foreign Application Priority Data

Sep. 3, 2007 (TW) .............................. 96132710 A (51) Int. Cl.
*G06F 15/177* (2006.01)
(52) U.S. Cl. .............................................. 713/2; 713/1
(58) Field of Classification Search .................. None
See application file for complete search history.

(56) References Cited

U.S. PATENT DOCUMENTS

| | | | | |
|---|---|---|---|---|
| 2006/0288422 | A1* | 12/2006 | Liu et al. | 726/26 |
| 2007/0150294 | A1* | 6/2007 | Rusman et al. | 705/1 |
| 2007/0214346 | A1* | 9/2007 | Shih | 713/1 |
| 2008/0222732 | A1* | 9/2008 | Caldwell et al. | 726/26 |
| 2008/0313472 | A1* | 12/2008 | Modesitt | 713/187 |

OTHER PUBLICATIONS

Wikipedia:Org: "System Locked Preinstallation" [Online], Jul. 29, 2007, p. 1, XP002534631.
"Improved Way to Add SLIC (SLP 2.0 Table into BIOS ACPI to Activate Windows Vista OEM" [Online], Feb. 18, 2007, pp. 1-9, XP002534431.

* cited by examiner

*Primary Examiner* — Dennis M Butler
(74) *Attorney, Agent, or Firm* — Ming Chun Chou (57) ABSTRACT

Methods and systems for updating a source image file in a BIOS memory are provided. In one embodiment of the method, an initialization document is loaded to generate a first image file, and the initialization document comprises a function setting and first and second address information associated with the function setting, and the function setting represents whether a system locked pre-installation (SLP) 2.0 is supported. The initialization document is loaded to write an SLP mark and an OEM public key to the first image file according to the first and second address information, serving as a second image file. The second image file is written into the source image file in the BIOS memory.

20 Claims, 7 Drawing Sheets

UPDATING A SOURCE IMAGE FILE IN A BIOS MEMORY

BACKGROUND OF THE INVENTION

1. Field of the Invention

The invention relates to update methods, and in particular to methods and systems for updating functions supported by basic input/output systems (BIOS) without amending source codes.

2. Description of the Related Art

Generally, basic input/output system (BIOS) is stored in a nonvolatile memory, such as read only memory (ROM), and comprises at least one image file (or binary file) for firmware to initialize components in computer systems thereby insuring that the initialized components can be operated normally before loading an operating system (OS).

The image files in the BIOS are typically generated by source codes provided by source code venders. In order to support different hardware elements, structures, or functions, the source code venders need to amend source codes manually to generate desired image files. However, for the BIOS venders having large number of OEM costumers, it is very time-consuming and inconvenient to amend source codes of the image files by cooperating with the source code venders.

BRIEF SUMMARY OF THE INVENTION

Embodiments of a method for updating a source image file in a BIOS memory are provided, in which an initialization document is loaded to generate a first image file, and the initialization document comprises a function setting and first and second address information associated with the function setting, and the function setting represents whether a system locked pre-installation (SLP) 2.0 is supported. The initialization document is loaded to write an SLP mark and an OEM public key to the first image file according to the first and second address information, serving as a second image file. The second image file is written into the source image file in the BIOS memory.

The invention provides an embodiment of a method for updating a source image file in a storage device, in which an initialization document is loaded to generate a first image file, and the initialization document comprises a function setting and first and second address information associated with the function setting. The initialization document is loaded to write second and third image files to the first image file according to the first and second address information, serving as a fourth image file. The fourth image file is written into the source image file in the storage device.

The invention provides an embodiment of a method for updating a source image file in a BIOS memory to support a system locked pre-installation (SLP) 2.0, in which an image file is generated according to an initialization document, an SLP marker and an OEM public key. The image file is written into the source image file in the BIOS memory such that the BIOS memory supports the SLP 2.0.

The invention provides an embodiment of a system for updating a source image file in BIOS memory, in which a first builder loads an initialization document to generate a first image file, wherein the initialization document comprises a function setting and first and second address information associated with the function setting. A second builder loads the initialization document to write second and third image files to the first image file according to the first and second address information, serving as a fourth image file. A writing device writes the fourth image file into the source image file in the storage device.

BRIEF DESCRIPTION OF THE DRAWINGS

The invention can be more fully understood by reading the subsequent detailed description and examples with references made to the accompanying drawings, wherein:

FIG. 5 shows an operating flowchart of BIOS according to the invention.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

In order to support the system locked pre-installation (SLP) 2.0 of a Microsoft® Vista operating system, an original equipment manufacturer (OEM) public key and an SLP marker are required to be built into BIOS memory in advance and an ACPI BIOS table is required to set whether an SLP 2.0 is supported.

The invention provides methods and systems for updating a source image file in BIOS ROM, and in particular, to methods and systems for updating a source image file in BIOS ROM without amending source codes in the BIOS ROM.

Figure 1:
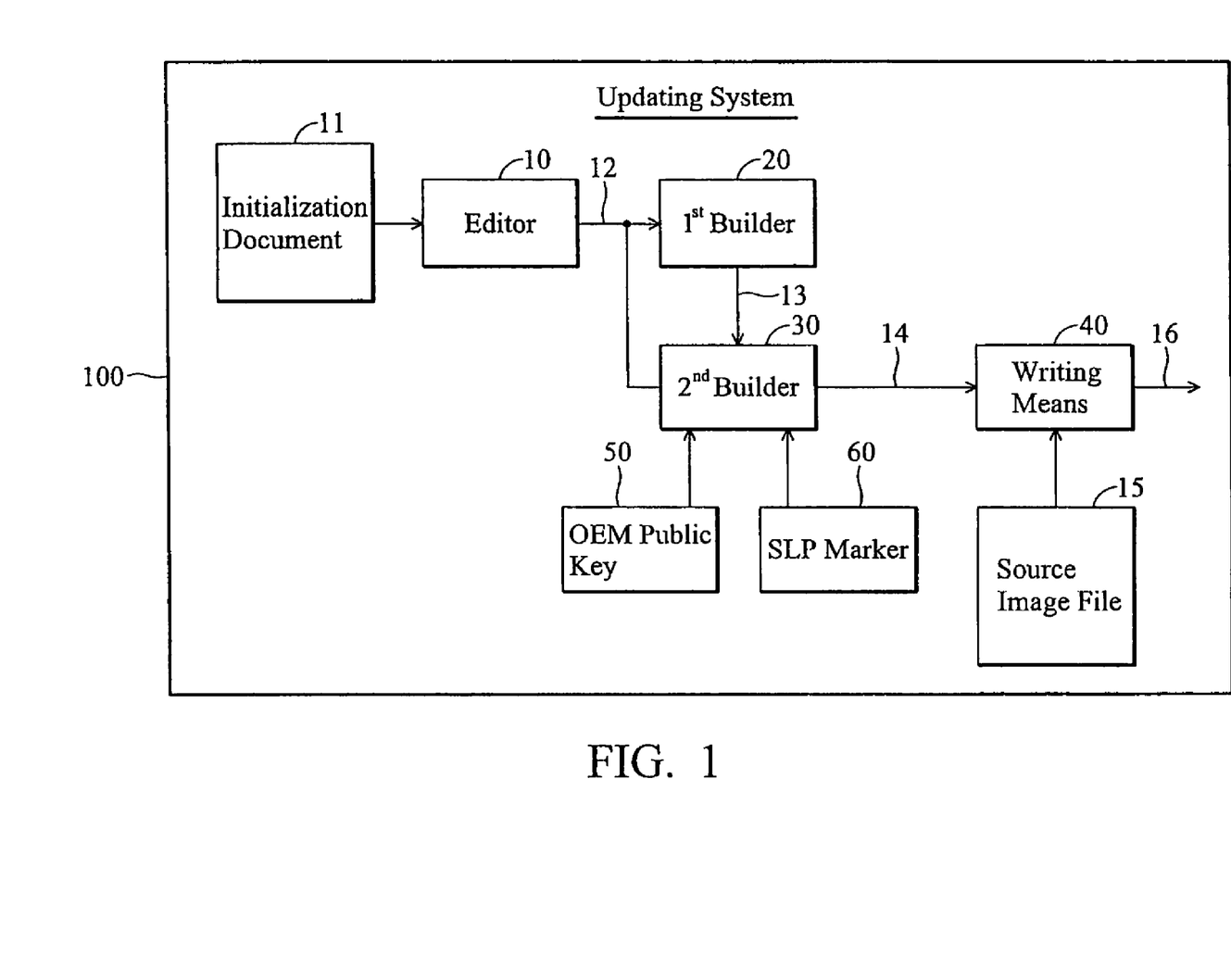
FIG. 1 shows an embodiment of a system for updating an image file in a BIOS ROM according to the invention.

FIG. 1 shows an embodiment of a system for updating a source image file in a BIOS ROM according to the invention. As shown, the system 100 comprises an editor 10, a first builder 20, a second builder 30 and writing means 40.

The editor 10 receives an initialization document 11 and provides a first graph user interface (GUI) (not shown) to assist users to set setting information recited in the initialization document 11, in which the initialization document 11 can be a text data (typically called XX.ini). In the embodiment, the initialization document 11 comprises at least one function setting to set whether an SLP 2.0 of a Vista operating system is supported, and first and second address information storing the OEM key 50 and the SLP marker 60, respectively.

It should be noted that the OEM key 50 and the SLP marker 60 are two image files obtained by an OEM after being authorized by Microsoft®. Users can load and edit the initialization document 11 through the first GUI to generate an initialization document 12 which supports or does not support the SLP 2.0 on their own. For example, a user can key in or pick at least one function setting in a predetermined item to decide whether an SLP 2.0 is supported or not. In addition, users can also amend the first and second address information for storing the OEM public key 50 and the SLP marker 60.

The first builder 20 receives (or loads) the edited initialization document 12 from the editor 10 and converts the edited initialization document 12 to an image file 13, in which the image file 13 can be a binary file (typically called XX.bin).

The second builder 30 inserts the OEM public key 50 and the SLP marker 60 to the image file 13 from the first builder 20 to generate an image file 14 according to the first and second address information in the edited initialization document 12. It should be noted that the image file 13 generated by the first builder 20 has information which supports the SLP 2.0 if the edited initialization document 12 by the editor 10 is set to support the SLP 2.0. Because the image file 14 is generated by inserting the OEM public key 50 and the SLP marker 60 into the image file 13, the image file 14 has the essential information for supporting the SLP 2.0. On the contrary, if the edited initialization document 12 is not set to support the SLP 2.0, the image file 13 does not support the SLP 2.0 even if the OEM public key 50 and the SLP marker 60 are inserted into the image file 13 by the second builder 30.

The writing means 40 inserts the image file 14 into a source image file 15 in a BIOS ROM (not shown) to generate a new image file 16. In embodiments of the invention, the source image file 15 is generated by a source code provided by a source code vender, but is not limited thereto. For example, users can select an address inserting the image file 14 into the source image file 15 via the writing means 40 on their own to generate the new image file 16.

In view of the above, users can generate image file 14 which support the SLP 2.0 via the editor 10, and first and second builder 20 and 30, on their own. Following, users can then insert the image file 14 to the source image file 15 in the BIOS ROM, without amending the source code, with cooperation with the source code vender, such that the BIOS ROM supports the SLP 2.0. In addition, the invention is not limited to be used only for updating BIOS to support the SLP 2.0, the invention can also be used for supporting any other functions.

Further, in some embodiments, the editor 10, the first and second builders 20 and 30 and the writing means 40 can be application programs stored in a storage device which is executable by a processor to provide related functions. In some embodiments, at least two of the editor 10, the first and second builders 20 and 30 and the writing means 40 can be integrated with each other for the convenience of users to generate new image files. For example, the second builder 30 can be integrated with the first builder 20, such that users can load the edited initialization document 12 to generate the image file 13 and insert the OEM public key 50 and the SLP marker 60 to the image file 13 to generate an image file 14 by only the first builder 20.

In addition, because users can decide on the address that inserts the image file 14 to the source image file 15 and the addresses that inserts the OEM public key 50 and the SLP marker 60 to the image file 13 on their own, users can avoid essential information supporting the SLP 2.0, such as the OEM public key 50 and the SLP marker 60, to be obtained by illegal methods.

Figure 2:
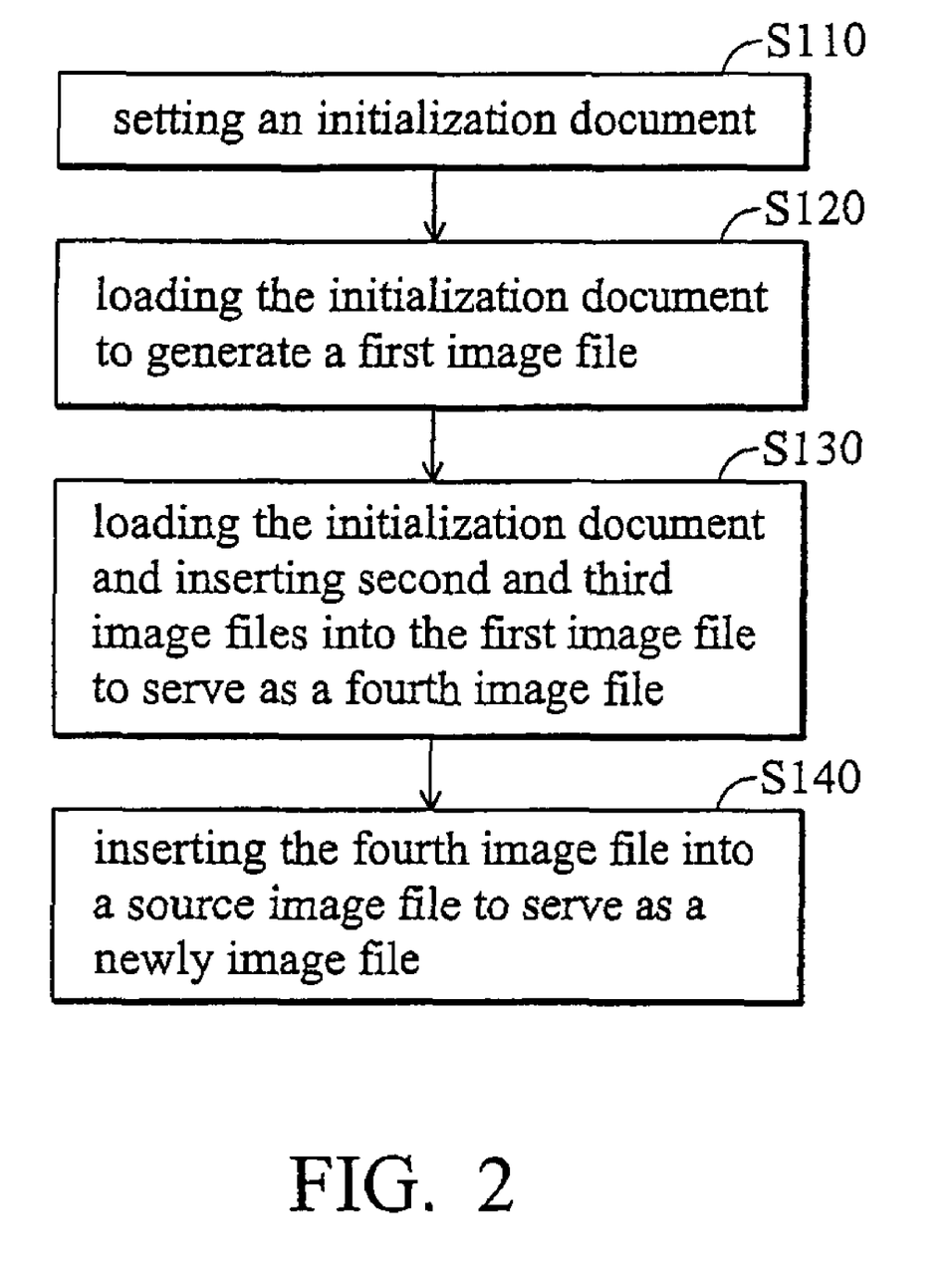
FIG. 2 is a flowchart of the updating method according to the invention.

FIG. 2 is a flowchart of the updating method according to the invention. As shown, the updating method comprises step S110 setting a function and first and second address information in an initialization document, step S120 loading the initialization document to generate a first image file, step S130 loading the initialization document and inserting second and third image files into the first image file to serve as a fourth image file, and step 140 inserting the fourth image file into a source image file to serve as a new image file.

Figure 3A:
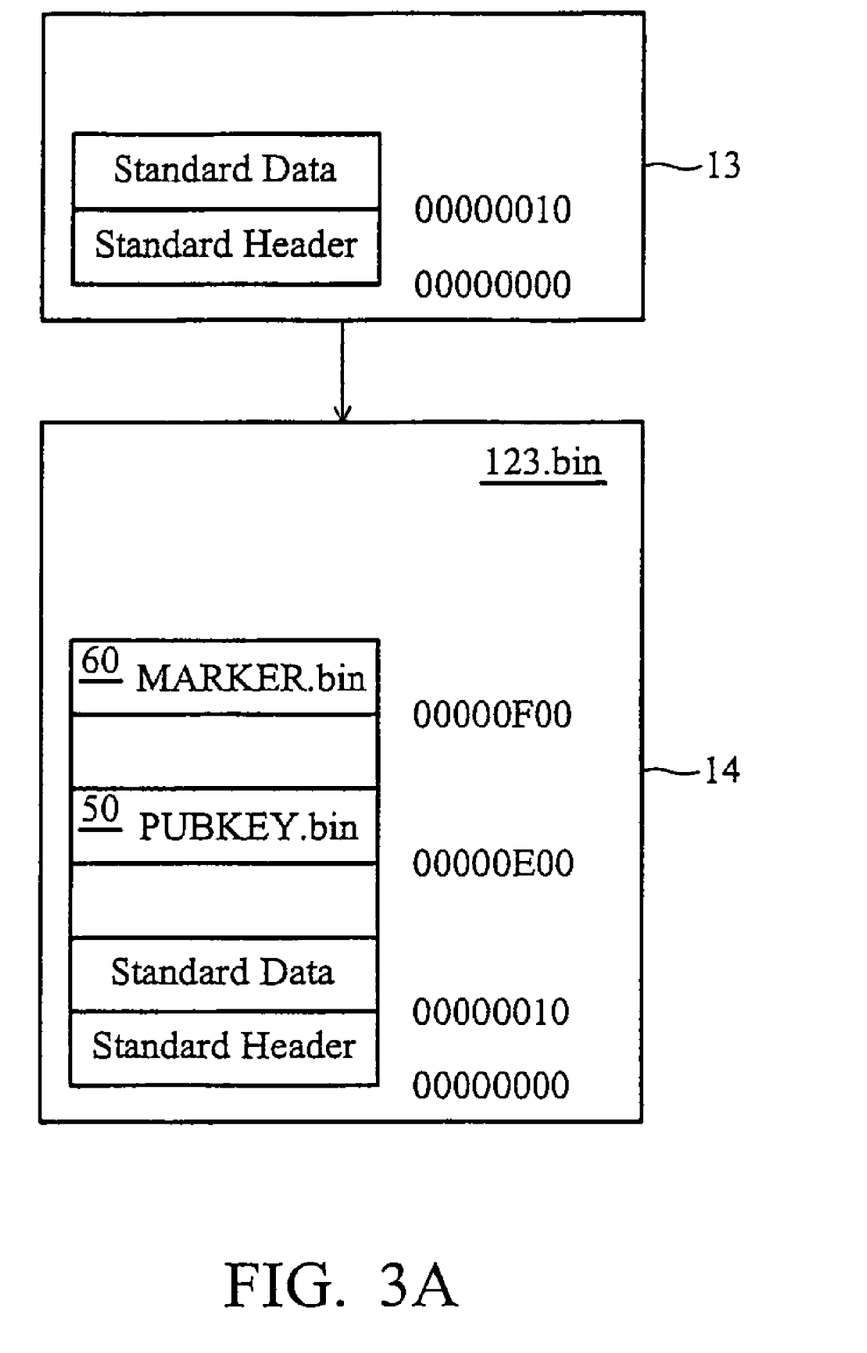
FIG. 3A shows a diagram of image files in the embodiments according to the invention.
Figure 3B:
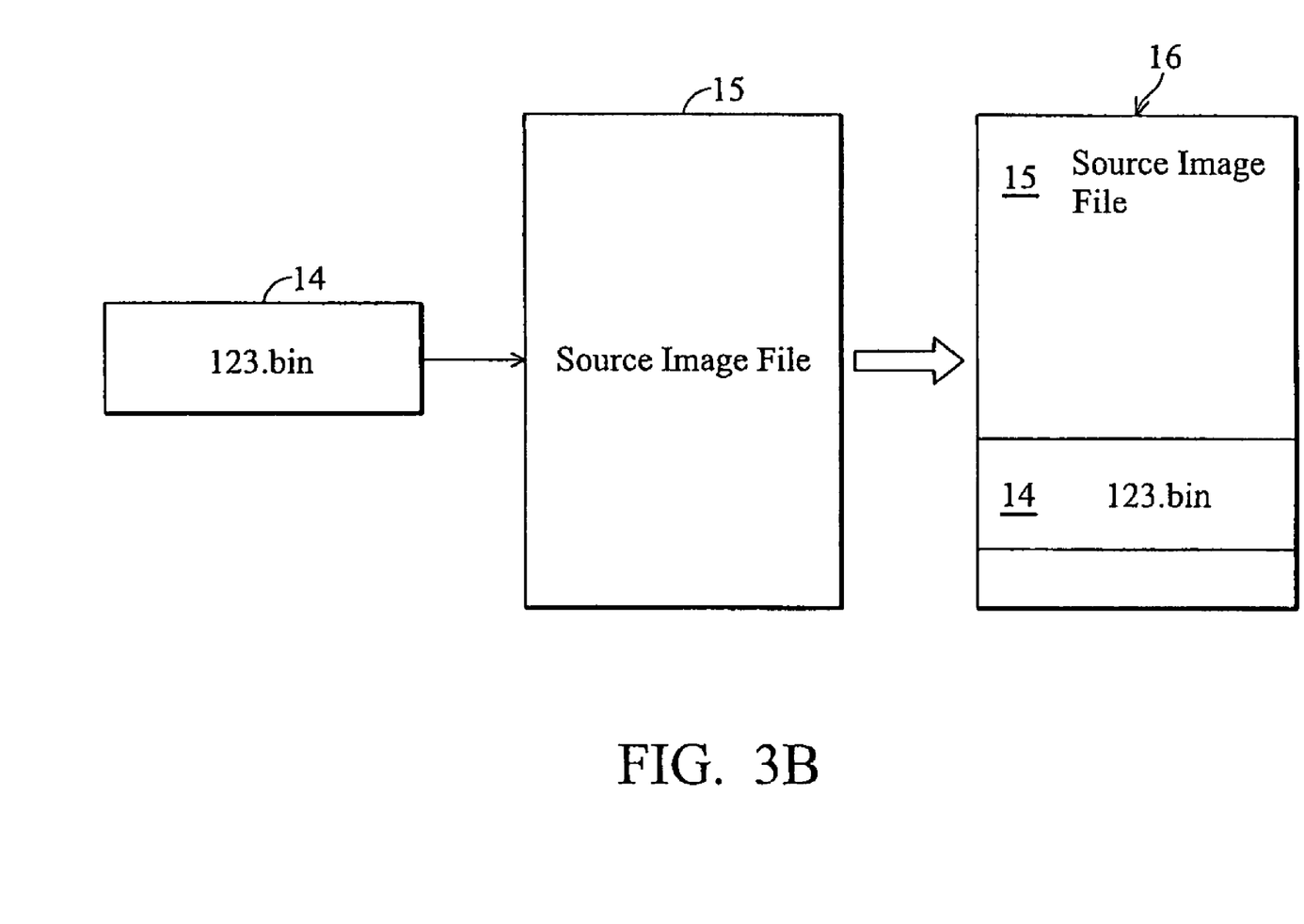
FIG. 3B show another diagram of the image files in the embodiments according to the invention.

FIG. 3A and FIG. 3B show diagrams of the image files in the embodiments according to the invention, and are used to illustrate steps 110~140 with reference to FIG. 1.

First, in step S110, users can set a function setting and first and second address information in an initialization document 11 by the editor 10. In the embodiment, the initialization document 11 can be a text data (typically called XX.ini), and comprises at least one function setting to set whether an SLP 2.0 of a Vista operating system is supported, and first and second address information storing the OEM key 50 and the SLP marker 60, respectively.

It should be noted that the OEM key 50 and the SLP marker 60 are two image files obtained by an OEM after being authorized by Microsoft®. For example, the editor 10 can provide a graph user interface (GPI) to help users to set (or edit) setting information recited in the initialization document 11. Users can load and edit the initialization document 11 to generate an edited initialization document 12 which supports or does not support the SLP 2.0 by the GUI of the editor 10.

In some embodiments, users can key in or pick at least one function setting in a predetermined item to decide whether an SLP 2.0 is supported or not, but is not limited thereto. In addition, users can also amend the first and second address information for storing the OEM public key 50 and the SLP marker 60.

Then, in step S120, the first builder 20 receives (or loads) the edited initialization document 12 and converts it into an image file 13 as shown in FIG. 3A. As shown, the image file 13 comprises at least two data blocks storing standard data and at least one header, respectively. For example, the image file 13 can be a binary file, its function and first and second address information are recited in the header, and the standard data comprises an OEM ID and an OEM table ID.

In step S130, the second builder 30 inserts the OEM public key (i.e., PUBKEY.bin) 50 and the SLP marker (i.e., MARKER.bin) 60 to the image file 13 according to the first and second address information recited in edited initialization document 12, serving as an image file 14. Thus, the image file 14 (i.e., 123.bin) comprising the essential information for supporting the SLP 2.0 is obtained as shown in FIG. 3A.

It should be noted that the image file 13 generated by the first builder 20 has information which supports the SLP 2.0 if the edited initialization document 12 by the editor 10 is set to support the SLP 2.0. On the contrary, if the edited initialization document 12 by the editor 10 is not set to support the SLP 2.0, the image file 13 does not support the SLP 2.0 even if the OEM public key 50 and the SLP marker 60 are inserted into the image file 13 by the second builder 30.

Finally, in step S140, the writing means 40 inserts the image file 14 to the source image file 15 in the BIOS ROM (not shown) to serve as a new image file 16. In the embodiments of the invention, the source image file 15 is generated by a source code provided by a source code vender. For example, user can decide an address inserting the image 14 (i.e. 123.bin) into the source image file 15 in the BIOS ROM via the writing means 40 by an optional ROM method.

In view of the above, users can generate image file 14 which support the SLP 2.0 via the editor 10, the first and second builder 20 and 30 on their own and then insert the image file 14 to the source image file 15 in the BIOS ROM without amending the source code by the source code vender, such that the BIOS ROM support the SLP 2.0. In addition, the invention is not limited to be used for only updating BIOS to support the SLP 2.0 and can also be used for supporting any other functions.

Figure 4:
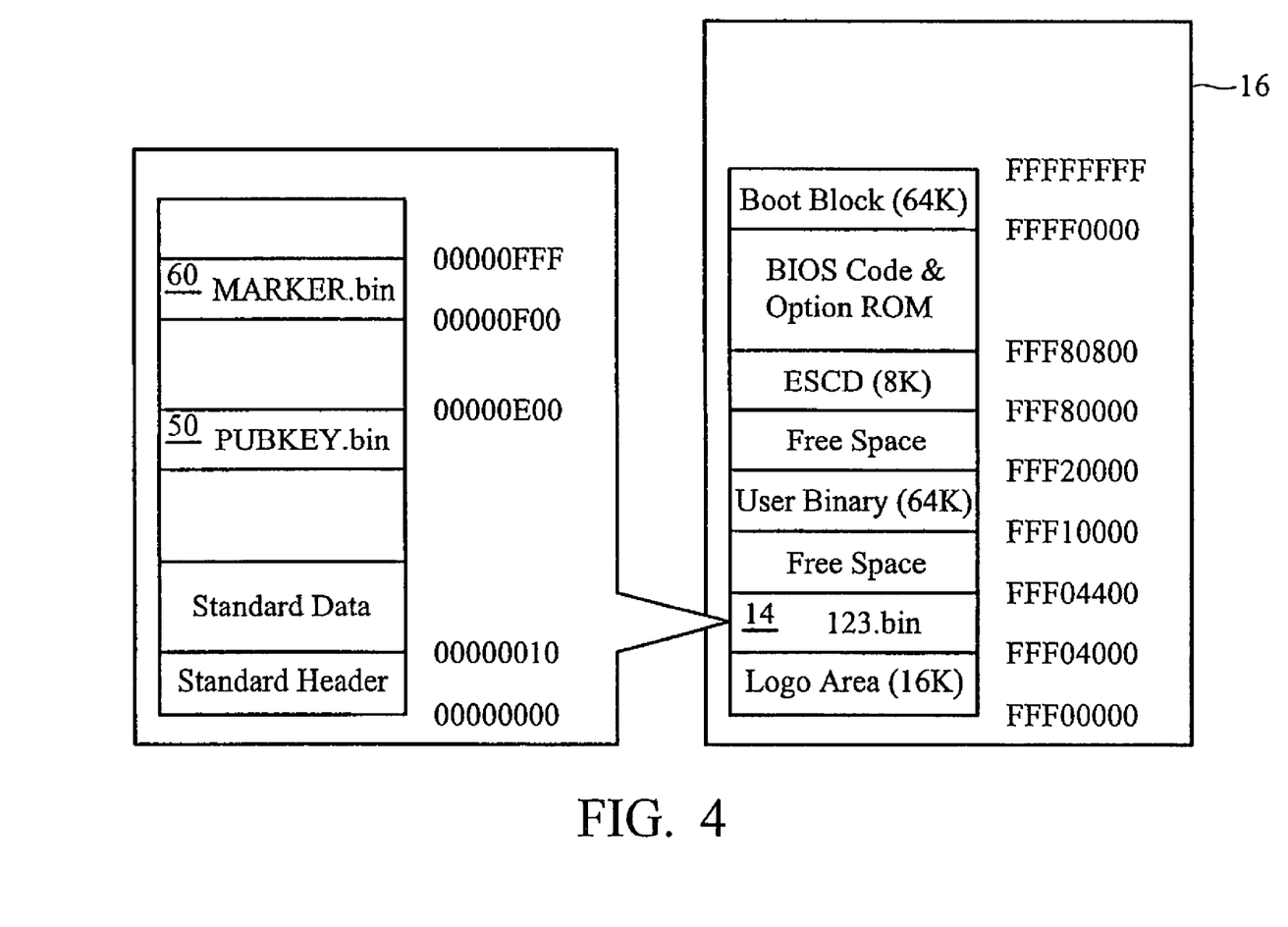
FIG. 4 show another diagram of the image files in the embodiments according to the invention.

As shown in FIG. 4, the new image file 16 comprises the source image file and the image file 14 having the essential information for supporting the SLP 2.0, and thus, the system locked pre-installation (SLP) 2.0 would pass when Vista operating system works.

Further, in some embodiments, the editor 10, the first and second builders 20 and 30 and the writing means 40 can be application programs stored in a storage device which is executable by a processor to provide related functions. In some embodiments, at least two of the editor 10, the first and second builders 20 and 30 and the writing means 40 can be integrated with each other for the convenience of users to generate new image files. For example, the second builder 30 can be integrated with the first builder 20, such that users can load the edited initialization document 12 to generate the image file 13 and insert the OEM public key 50 and the SLP marker 60 to the image file 13 to generate an image file 14 by only the first builder 20.

In addition, because users can decide on the address that inserts the image file 14 to the source image file 15 and the addresses that inserts the OEM public key 50 and the SLP marker 60 to the image file 13 on their own, users can avoid essential information supporting the SLP 2.0, such as the OEM public key 50 and the SLP marker 60, to be obtained by illegal methods.

Figure 51:
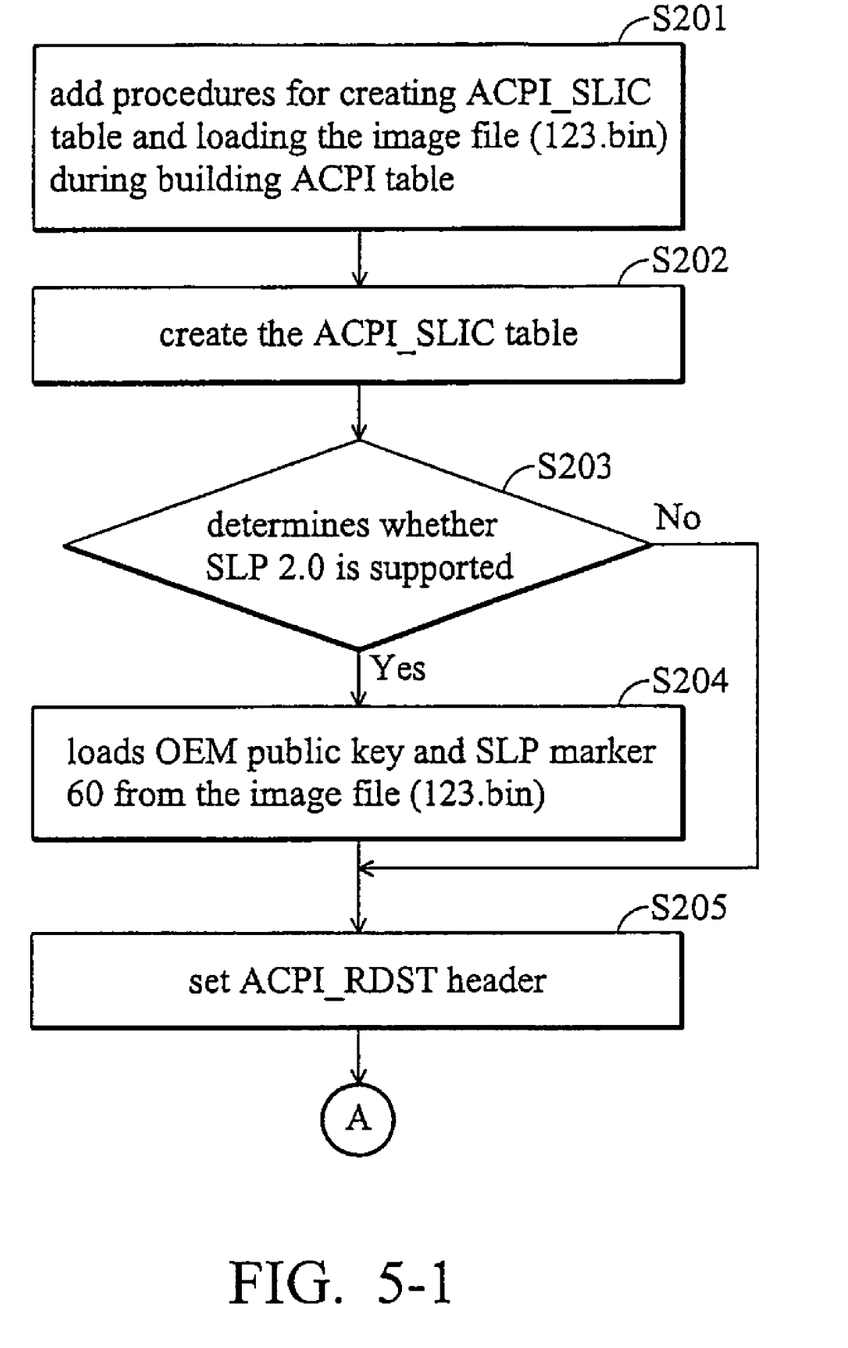
Figure 52:
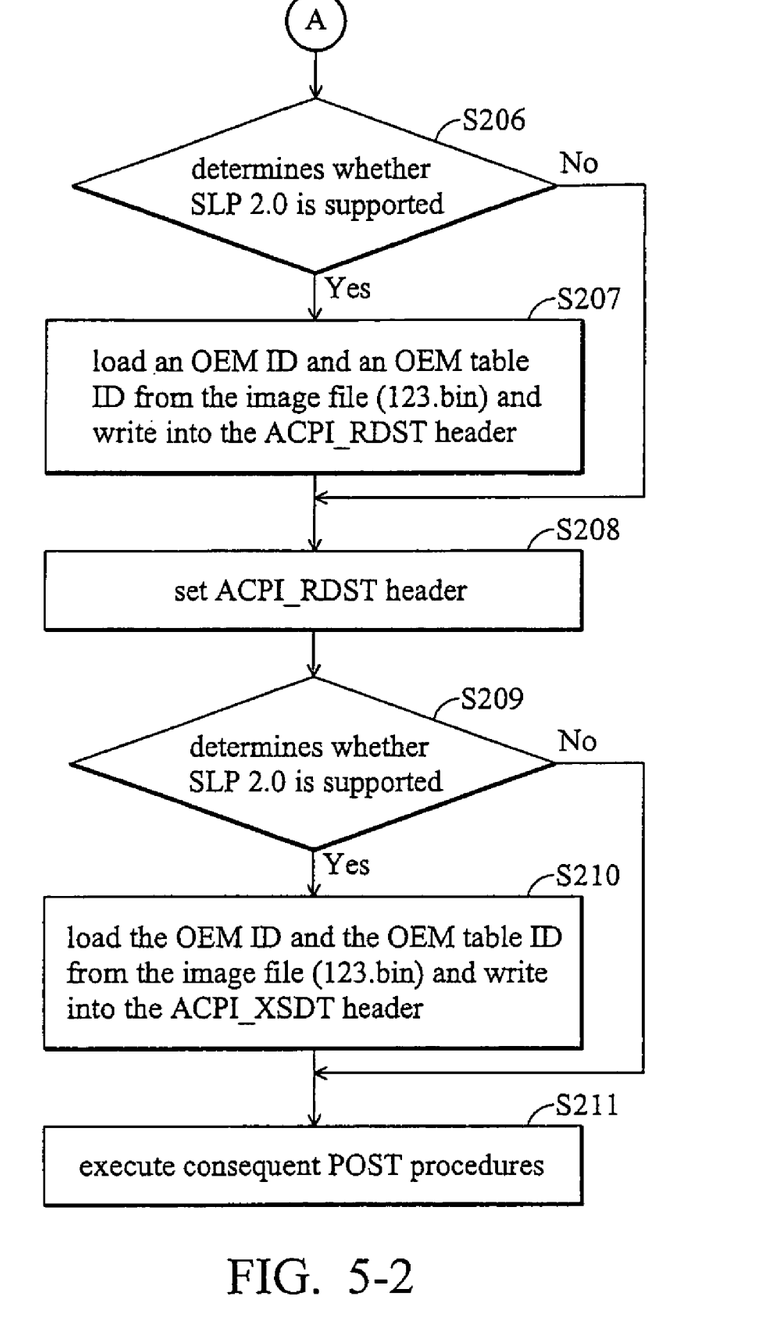

FIG. 5 (i.e., FIGS. 5-1 and 5-2) shows an operating flowchart of BIOS. The image file in BIOS ROM is assumed to be the image file 16 comprising the image file 14 (i.e. 123.bin).

In step S201, a CPU (not shown) adds procedures for creating an ACPI_SLIC table and loading the image file 14 (123.bin) during creation of an advanced configuration and power interface (ACPI) table. Then, in step S202, the CPU creates the ACPI_SLIC table. In step S203, the CPU determines whether an SLP 2.0 is supported according to the image file 14. If an SLP 2.0 is supported, step S204, supporting procedure for the SLP 2.0, is executed, and if not, the step S204 is skipped and step 205 is executed.

In step S204, the CPU loads the OEM public key 50 (i.e., PUBKEY.bin) and the SLP marker 60 (i.e., MARKER.bin) from the image file 14 (i.e., 123.bin) and writes the OEM key 50 and the SLP marker 60 into the ACPI_SLIC table. Then, in step S205, the CPU sets an ACPI root system description (ACPI_RDST) header.

In step S206, the CPU again determines whether an SLP 2.0 is supported according to the image file 14. If the SLP 2.0 is supported, step S207, a corresponding supporting procedure for the SLP 2.0, is executed, and if not, the step S207 is skipped and step 208 is executed.

In step S207, the CPU loads an OEM ID and an OEM table ID from the image file 14 (i.e., 123.bin) and writes the IDs into the ACPI_RDST header. Then, in step S208, the CPU sets an ACPI extend system description (ACPI_XDST) header.

In step S209, the CPU again determines whether an SLP 2.0 is supported according to the image file 14. If the SLP 2.0 is supported, step S210, a corresponding supporting procedure for the SLP 2.0, is executed, and if not, the step S210 is skipped and step 211 is executed.

In step S210, the CPU loads the OEM ID and the OEM table ID from the image file 14 (i.e., 123.bin) and writes the IDs into the ACPI_XSDT header. Then, in step 211, CPU executes consequent POST procedures to complete booting.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for updating a source image file in a BIOS memory, comprising:
converting an initialization text file to a first image file, wherein the initialization text file comprises a function setting and first and second address information associated with the function setting, and the function setting represents whether a system locked pre-installation (SLP) 2.0 is supported;
writing a SLP mark and an OEM public key to the first image file to generate a second image file according to the first and second address information of the initialization text file; and
writing the second image file into the source image file in the BIOS memory.

2. The method as claimed in claim 1, further comprising providing a first builder to convert the initialization text file to the first image file.

3. The method as claimed in claim 2, further comprising providing a second builder to generate the second image file according to the initialization text file.

4. The method as claimed in claim 2, further comprising generating the second image file by the first builder according to the initialization text file.

5. The method as claimed in claim 1, further comprising providing an editor to set the function setting, and the first and second address information.

6. A method for updating a source image file in a storage device, comprising:
converting an initialization text file to a first image file, wherein the initialization text file comprises a function setting and first and second address information associated with the function setting;
writing a second image file and a third image file to the first image file to generate a fourth image file according to the first and second address information of the initialization text file; and
writing the fourth image file into the source image file in the storage device.

7. The method as claimed in claim 6, further comprising providing a first builder to convert the initialization text file to the first image file.

8. The method as claimed in claim 7, further comprising providing a second builder to generate the fourth image file according to the initialization text file.

9. The method as claimed in claim 7, further comprising generating the fourth image file by the first builder according to the initialization text file.

10. The method as claimed in claim 6, further comprising providing an editor to set the function setting, and the first and second address information.

11. The method as claimed in claim 6, wherein the function setting represents whether a system locked pre-installation (SLP) 2.0 is supported.

12. The method as claimed in claim 6, wherein the second image file is a system locked pre-installation (SLP) marker.

13. The method as claimed in claim 6, wherein the third image file is an OEM public key.

14. The method as claimed in claim 6, wherein the storage device is a BIOS memory.

15. A system for updating a source image file in BIOS memory, comprising:
a first builder for converting an initialization text file to a first image file, wherein the initialization text file comprises a function setting and first and second address information associated with the function setting;
a second builder for writing a second image file and a third image file to the first image file to generate a fourth image file according to the first and second address information of the initialization text file; and
a writing device writing the fourth image file into the source image file in the storage device.

16. The system as claimed in claim 15, further comprising an editor setting the function setting, and the first and second address information.

17. The system as claimed in claim 16, wherein the function setting represents whether a system locked pre-installation (SLP) 2.0 is supported.

18. The system as claimed in claim 17, wherein the second image file is a system locked pre-installation (SLP) marker for the SLP 2.0.

19. The system as claimed in claim 18, wherein the third image file is an OEM public key.

20. A method for updating a source image file in a BIOS memory to support a system locked pre-installation (SLP) 2.0, the method comprising:
  generating an image file according to an initialization text file, an SLP marker and an OEM public key; and
  writing the image file into the source image file in the BIOS memory such that the BIOS memory supports the SLP 2.0.

* * * * *